Dec. 28, 1965     E. O. ROE     3,226,585
DYNAMO-ELECTRIC MACHINE COIL RETAINING MEANS
Filed June 26, 1962     2 Sheets-Sheet 1
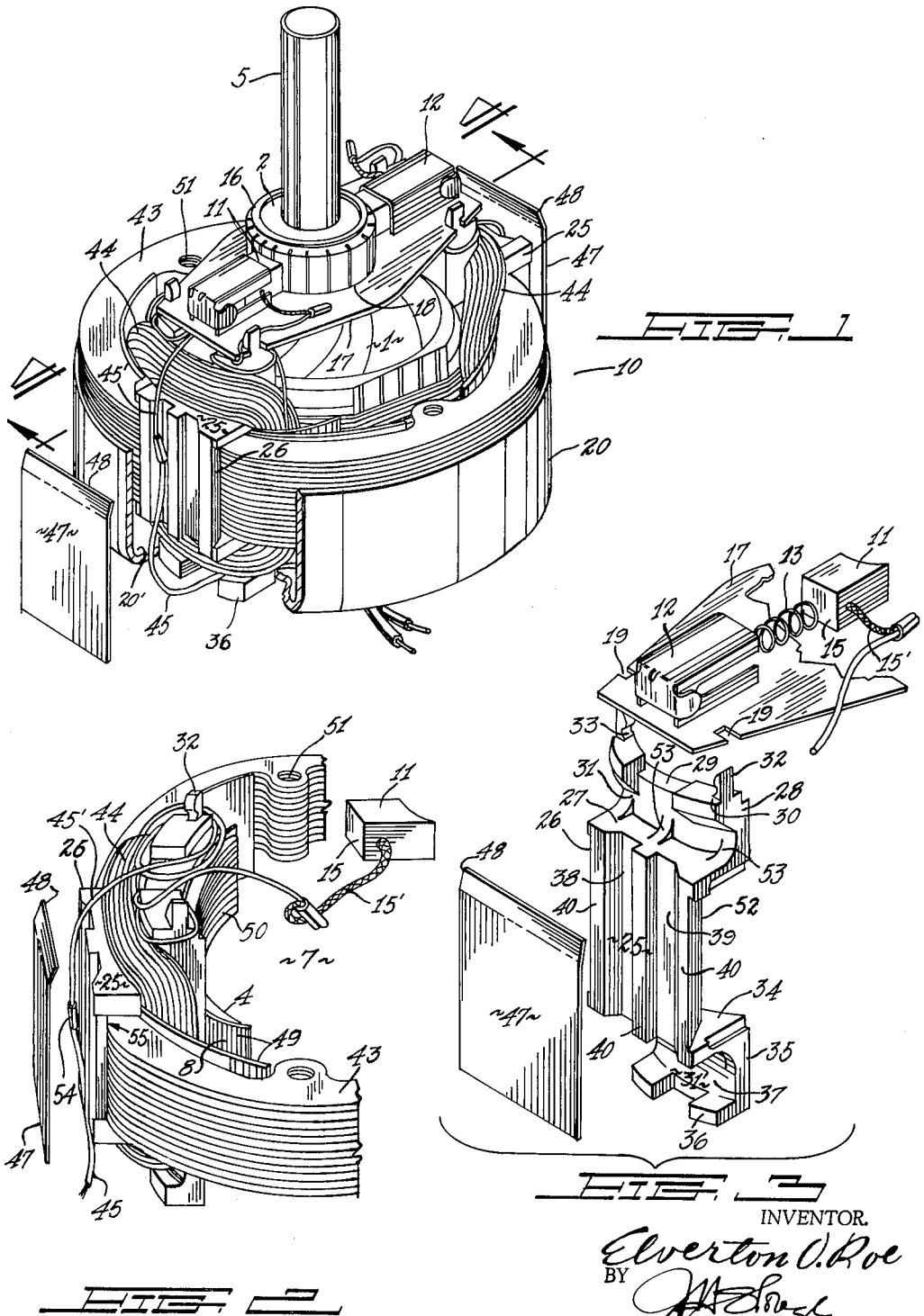
INVENTOR.
Elverton O. Roe
BY
Attorney Dec. 28, 1965  E. O. ROE  3,226,585
DYNAMO-ELECTRIC MACHINE COIL RETAINING MEANS
Filed June 26, 1962  2 Sheets-Sheet 2
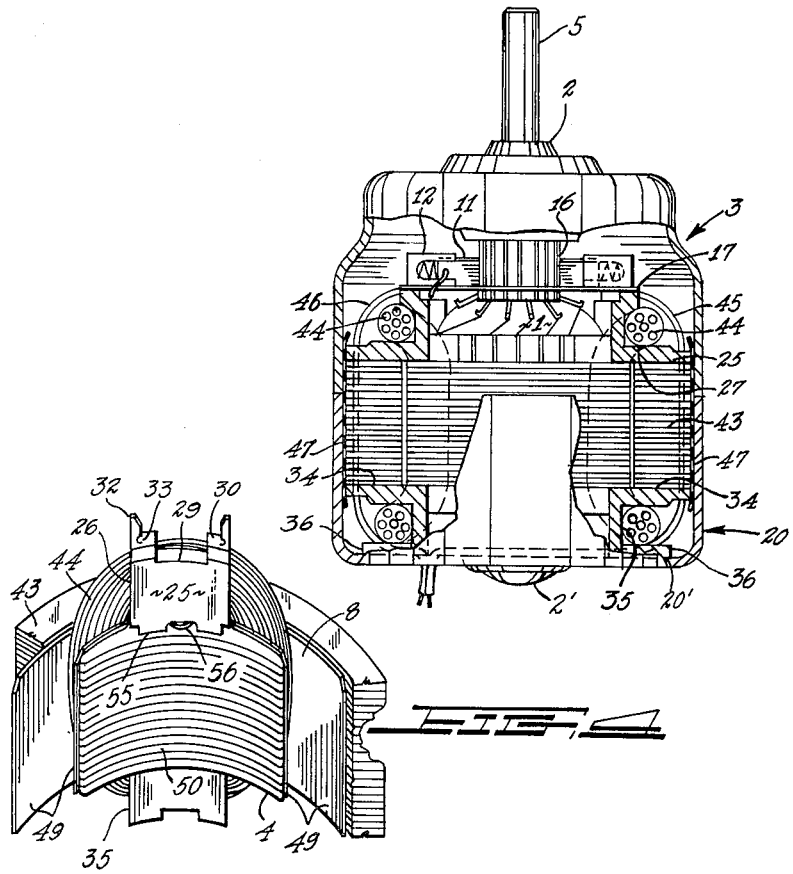
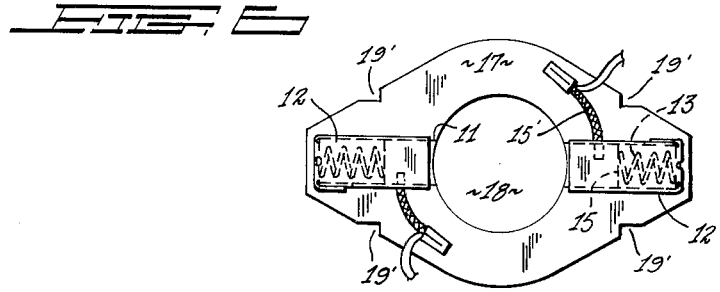
INVENTOR.
Elverton O. Roe
BY
Attorney United States Patent Office 3,226,585
Patented Dec. 28, 1965

3,226,585
DYNAMO-ELECTRIC MACHINE COIL
RETAINING MEANS
Elverton O. Roe, Elyria, Ohio, assignor to General Industries Company, Elyria, Ohio, a corporation of Ohio
Filed June 26, 1962, Ser. No. 205,269
8 Claims. (Cl. 310—194)

My invention relates to improvements in electric motors, and more particularly relates to fractional horsepower direct current motors such as are used to drive automotive accessories, though not limited thereby.

Among the objects of my invention is to provide an electric motor assembly having relatively few parts, each of relatively simple construction, which permit facile assembly, economy in construction and relatively sturdy construction.

Another object of my invention is to provide improved means for positioning the stator assembly and associated brush rigging in relation to the bearing carrying cover whereby troublesome variations in manufacture are eliminated which result in improper axial alignment of brushes with the commutator.

Another object of my invention is to provide relatively simple means for the winding of field coils and their assembly in the motor structure.

Other objects, and the nature of the invention, will be readily apparent from the following specification, descriptive of a presently preferred embodiment, which is shown in the accompanying drawings, in which:

FIG. 1 is a perspective view of the motor assembly of my invention, portions of the casing being removed for clarification;

FIG. 2 is a perspective view of a portion of the motor assembly of FIG. 1 with the casing removed;

FIG. 3 is an exploded view of the coil and brush support of the motor assembly and of an end portion of a brush support card;

FIG. 4 is a side elevational view of the motor assembly in partial section, said section being taken along the line 4—4 of FIG. 1;

FIG. 5 is a top view of a modification of the brush support card; and

FIG. 6 is a fragmentary perspective view of the inner face of the stator and support.

Referring now to the drawings, in all of which like parts are designated by like reference characters, in FIG. 1, a perspective view through a dynamoelectric machine generally designated by the numeral 10 is shown, which may be a fractional horsepower commutator type electric motor. The housing for such machine generally consists of two cup-shaped casing elements 3 and 20 adapted to be tightly secured in abutting engagement to form a housing for the motor. The motor includes a rotor shaft 5, an armature designated generally at 1, consisting of an armature of the usual laminated construction mounted on the shaft 5 journalled in bearings 2 and 2' at the ends of the housing and a current collector member or commutator 16 suitably mounted on the shaft for rotation within the stator, coaxial with the armature and rotatable therewith, which conducts curren from brushes 11 to the coils of the armature 1, the commutator segments being connected in the usual manner to the armature 1 and the field coils 44. The armature 1 is adapted to rotate within a completely closed stationary magnetic circuit formed by a magnetic field structure 43 consisting of a lamination of layers of magnetic material each comprising a pair of oppositely positioned inwardly extending pole pieces 4 which terminate in concave-shaped pole faces 50 defining a cylindrical bore 7 to receive the rotor 1. The pole pieces 4 are formed with leading and lagging tips which are spaced from the cylindrical core 43 to provide wall surfaces defining spaces of U-shape 8. The layers are secured together by screws or rivets disposed through aligned openings in the said laminations and by a pair of field coil and brush plate retainers or supports 25. Each support, which is preferably made of nylon or other suitable insulating material, is adapted to have a field coil winding 44 positioned thereon and carries a unitary brush support card 17 detachably thereon, said card having a cylindrical bore 18 therein, wherefor the card is telescoped over the rotor shaft 5 and encircles the commutator 16. The stator structure 43 is adapted to be wedged in snug engagement with the motor casing portions 3 and 20 except at its generally U-shaped oppositely disposed recessed portions 55. The supports 25 comprise outwardly disposed elongated vertical side walls 26 and each support is provided with generally U-shaped end portions at either end integrally formed of inwardly protruding horizontally disposed upper and lower ends 27 and 34 respectively embracing the side and the horizontal top and lower surfaces respectively of the core 43 and intermediate portions of the upper and lower surfaces respectively of the pole pieces 4; the upper surface 27 terminating in a generally vertically disposed upwardly projecting portion 28 and the surface 34 terminates in a generally vertically downwardly extending portion 35; the said portions 28 and 35 in turn terminating in outwardly and generally horizontally extending bifurcated portions 31 and 37 respectively, each having outwardly extending shoulders 30—30 and 36—36 having recesses 29 and 31' provided therebetween.

The outermost portions of the shoulders 30 are provided with upwardly protruding prongs 32 preferably notched at 33 on their mutually facing interspaced sides to seat the card 17. The outer face of the upwardly extending portion 28 and of the portion 35, between their shoulder portions 30—30 and 36—36 and the horizontal portions 27 and 34 respectively of the supports 25, are preferably provided with arcuate ribs 53 to aid in guiding the field coil 44 during winding and affords upper and lower recesses 31 and 31' for the upper and lowermost coil windings.

The bottom surfaces of the shoulders 36 are adapted to be snugly engaged with an inner surface portion 20' of the bottom casing 20. The vertical wall 26 of each retainer 25 is, as shown, provided with parallel vertical grooves 38 and 39 extending the entire length of the said wall 26. A rectangular preferably flexible sheet of impregnated cardboard or other suitable insulation material 47, having its upper most edge angled inwardly at 48 is provided to insulate a bare end 45' of the coil winding which is secured as at 54 to an insulated lead 45 and disposed within one of the vertical grooves 38 or 39.

Certain of the advantages in this improved motor construction are of interest in connection with the initial winding and assembly of the field coils.

The core 43 with retainer members 25 positioned in the recesses 55 of the core in opposite relation one to the other are first placed in a coil winding machine and the two field coils wound into position by first taking one or two turns of magnet wire around the shoulders 30, next threading the same through one of the U-shaped spaces 8 between the core and the pole tips, the windings being separated from the contiguous core and pole surfaces by a strip of insulating material 49 wrapped about such surfaces and lining the U-space. The wire next passes through the U-shaped bottom wall recess 31' and is brought up through a similar insulated U-space 8 disposed on the opposite side of the member 25 and passes through the upper U-shaped wall recess 31'. This operation continues until the proper number of turns is obtained. When the coil winding is completed, one or two turns of the end winding is wound around the shoulder complementary to the one at 30 from which the winding operation began. Due to the securing of the end turns to the shoulders 30, it is not necessary to tape this portion of the coil to prevent coil unravelling, as in past practice.

In conjunction with my preferred field coil and brush support device, I preferably utilize an oval shaped brush carrying card 17 of slightly less length than the diameter of the core provided with a pair of U-shaped notches 19 or V-shaped notches 19' as in the form of FIG. 5. The notches 19, 19' are disposed as to be aligned with the recesses 33 in the prongs 32. The card 17 as described is of larger diameter than the commutator 16 and is provided with a circular opening 18 which encircles the said commutator. Opposite brush housings 12 are mounted in any suitable manner on the upper side of the ovate ends of the carrying card 17, and preferably house springs 13 which yieldingly urge brushes 15 mounted within the housings against the surface of the commutator 16.

To assemble the motor, the supports 25 are placed on the core 43 and the coils 44 wound, as previously described, with the inner and outer ends thereof wound about the shoulders 30. One of the ends of the coil 45' is brought down into one of the slots 38 or 39 and is there crimped or soldered to an insulated input wire 45. This assembly is then placed within the lower motor casing 20, which snugly engages the core but is separated from the casing by an insulating member 47 which is inserted between each of the nylon supports 25 and the core 43, effectively insulating the ends of said field coils and their junction 54 with the power source lead. The rotor assembly 1 is then inserted within the bore 7 and rests on the inboard bearing 2' in the lower casing 20. As previously pointed out the shoulders 36 are in flush engagement with the inner faces of the bottom portion of the motor casing 20 and the inner horizontal portion 34 of the support 25 is in flush engagement with the bottom horizontal face of both the core 43 and intermediate portions of pole pieces 4 as at 55. As shown in FIG. 6, the horizontal portion 27 is notched on its lower inner face to accommodate a rivet head 56 which extends through the laminations and holds them in tight parallel engagement.

The brush carrying card 17 is then simply and readily snapped into locking engagement with the prongs 32 by aligning the slots 19 or 19' with the upwardly extending and somewhat flexible prongs 32 and by exerting manual pressure thereon. The pigtails 15' of the brushes 15 are then crimped to the remaining end of the field coil 44. The upper casing member 3 is next placed over the motor drive shaft 5 and lowered so as to dispose the shaft 5 in the outboard bearing 2 and encompasses a portion of the core 43. Bolts are then inserted through appropriately located openings in the top and bottom casing passing through oppositely located openings 51 in the core 43. It can thus be seen that assembly or disassembly for repair or brush replacement is an extremely simple operation, requiring only the tightening or loosening of assembly bolts, placement or removal of a pair of casings 3 and 20, crimping or uncrimping of pigtail connections and the manual pressure on the brush carrying card 17.

It can readily be seen further that the field coils need not be taped nor will the connection with the lead or brush require sleeving and that the coils can readily and expeditiously be applied to the core, retained during winding and assembly in definite location, and protected during handling and assembly. It will also be observed that the combined field coil and brush support of my invention further serves to locate not only the wound stator but the stator and brush support with relation to the housing.

Manifestly, minor changes in details of construction can be effected by those skilled in the art without departing from the spirit and the scope of the invention as defined in and limited solely by the appended claims.

What I claim is:

1. A pair of coil support devices for electric motors of the type having a commutator at one end of a centrally disposed rotor and comprising a field structure enclosing said rotor, said field structure comprising a magnetic field of substantially annular form having a pair of inwardly extending concave pole pieces defining a bore to receive said rotor and spaced from the annular portion of said field structure to provide coil winding space therebetween for laterally disposed windings of each coil winding, the exterior face of said annular portion being provided on opposite sides thereof with generally U-shaped recesses, each coil support device having a generally elongated vertical medial portion adapted to be seated within said U-shaped recesses, a pair of generally U-shaped end portions at opposite ends of said medial portion, said U-shaped end portions affording recesses for the opposite end windings of the field coil.

2. A pair of coil support devices for electric motors of the type having a commutator at one end of a centrally disposed rotor and comprising a field structure enclosing said rotor, said field structure comprising a magnetic field of substantially annular form having a pair of inwardly extending concave pole pieces defining a bore to receive said rotor and spaced from the annular portion of said field structure to provide generally U-shaped coil winding space on either side thereof for laterally disposed windings of each coil winding, the exterior face of said annular portion being provided on opposite sides thereof with generally U-shaped recesses, each said coil support devices being adapted to be seated within one of said U-shaped recesses, each support device having a generally elongated vertical medial portion, a pair of generally U-shaped end portions at opposite ends of said medial portion, said U-shaped end portions affording recesses for the opposite end windings of the field coil.

3. A coil support as claimed in claim 1, each of the said U-shaped end portions being provided with a pair of shoulders, each said shoulder of the uppermost of said end portions being provided with an upwardly extending prong, said prongs being in alignment, an apertured brush support member adapted to encircle said commutator and adapted to be wedged at an outermost end portion into seating engagement with said prongs.

4. A coil support as claimed in claim 3, said prongs being in alignment, the apertured brush support member adapted to be wedged at an outermost end portion into seating engagement with a notch provided inwardly of each said prong.

5. A brush holder assembly for direct current motors comprising a pair of generally vertically disposed brush card supports, said supports adapted to be disposed, in substantial parallelism, at relatively opposite sides of the commutator, and each support comprising a vertical medial portion, substantially U-shaped opposite end portions, the uppermost of said U-shaped end portions being provided with a pair of upstanding spaced members, each upstanding member being provided with a notch, an integral centrally apertured brush support member encircling the said commutator having opposite end portions adapted to be wedgingly seated within said notches, a motor casing, the vertical portion of said supports being disposed adjacent the lateral wall of said casing, the lowermost said U-shaped end portion of said support being seated upon the bottom wall of said casing.

6. A brush holder assembly for direct current motors comprising a pair of generally vertically disposed brush card supports, said supports adapted to be disposed, in substantial parallelism, at relatively opposite sides of the commutator, and each support comprising a vertical medial portion, substantially U-shaped opposite end portions, the uppermost of said U-shaped end portions being provided with a pair of upstanding spaced members, each member being provided with a notch, an integral centrally apertured brush support member encircling the said commutator having opposite end portions adapted to be wedgingly seated within said notches, a motor casing, the vertical portion of said supports being disposed adjacent the lateral wall of said casing, insulating material being interposed between each said vertical portion and the said lateral wall of said casing, the lowermost said U-shaped end portion of said support being seated upon the bottom wall of said casing.

7. Brush card supports as claimed in claim 5 in which said supports are integrally formed of molded nylon.

8. A pair of coil support devices for electric motors of the type having a commutator at one end of a centrally disposed rotor and comprising a field structure enclosing said rotor, said field structure comprising a magnetic field of substantially annular form having a pair of inwardly extending concave pole pieces defining a bore to receive said rotor and spaced from the annular portion of said field structure to provide generally U-shaped coil winding space on either side thereof for laterally disposed windings of each coil winding, the exterior face of said annular portion being provided on opposite sides thereof with generally U-shaped recesses, each said coil support devices being adapted to be seated within one of said U-shaped recesses, each support device having a generally elongated vertical medial portion, a pair of generally U-shaped end portions at opposite ends of said medial portion, said U-shaped end portions affording recesses for the opposite end windings of thte field coil, the vertical medial portion of each support device being provided with guide grooves for positioning leads from the commutator to an opposite end of the motor for exit.

References Cited by the Examiner
UNITED STATES PATENTS

| | | | |
|---|---|---|---|
| 2,504,564 | 4/1950 | Merriam | 310—239 |
| 2,894,157 | 7/1959 | Morrill | 310—194 |
| 2,931,930 | 4/1960 | Hanscom | 310—194 |
| 3,028,515 | 4/1962 | Cheetham | 310—247 |
| 3,138,728 | 6/1964 | Videtic | 310—247 X |

ORIS L. RADER, *Primary Examiner.*

MILTON O. HIRSHFIELD, *Examiner.*

D. F. DUGGAN, P. L. McBRIDE, *Assistant Examiners.*